US008374640B2

(12) United States Patent
Baccelli et al.

(10) Patent No.: US 8,374,640 B2
(45) Date of Patent: Feb. 12, 2013

(54) CONTROLLING A COMMUNICATION SYSTEM

(75) Inventors: Francois Baccelli, Meudon (FR); Chung Shue Chen, Paris (FR); Laurent Thomas, Palaiseau (FR)

(73) Assignee: Alcatel Lucent, Paris (FR)

( * ) Notice: Subject to any disclaimer, the term of this patent is extended or adjusted under 35 U.S.C. 154(b) by 103 days.

(21) Appl. No.: 13/097,713

(22) Filed: Apr. 29, 2011

(65) Prior Publication Data

US 2012/0276885 A1 Nov. 1, 2012

(51) Int. Cl.
*H04B 15/00* (2006.01)
(52) U.S. Cl. ............. 455/501; 455/67.13; 455/423; 375/224
(58) Field of Classification Search ............. 455/501, 455/67.13, 423; 375/224
See application file for complete search history.

(56) References Cited

U.S. PATENT DOCUMENTS

| 2002/0144272 | A1* | 10/2002 | McLain et al. | ........... 725/76 |
| 2005/0058151 | A1* | 3/2005 | Yeh | ............. 370/445 |
| 2005/0085233 | A1* | 4/2005 | Boyer et al. | ........ 455/446 |
| 2006/0009226 | A1* | 1/2006 | Vicharelli et al. | ....... 455/450 |
| 2006/0142015 | A1* | 6/2006 | Boyer et al. | ......... 455/447 |
| 2008/0144493 | A1* | 6/2008 | Yeh | ............. 370/230 |
| 2009/0225982 | A1* | 9/2009 | Yener et al. | ............. 380/44 |
| 2010/0246650 | A1* | 9/2010 | Erb | ............. 375/224 |

OTHER PUBLICATIONS

Qian, L. et al. "MAPEL: Achieving Global Optimality for a Non-Convex Wireless Power Control Problem", IEEE Transactions on Wireless Communications Wireless, vol. 8, No. 3, pp. 1553-1563, Mar. 2009.
Huang, J. et al. "Distributed Interference Compensation for Wireless Networks", IEEE Journal on Selected Areas in Communications, vol. 24, No. 5, pp. 1074-1084, May 2006.

* cited by examiner

*Primary Examiner* — Danh Le
(74) *Attorney, Agent, or Firm* — Harness, Dickey & Pierce

(57) ABSTRACT

In a communication system, a plurality of communication entities can establish a plurality of communication links that can potentially interfere with each other. A control of the communication system involves repetitively carrying out a probabilistic parameter setting step for respective communication links. In such a probabilistic parameter setting step, a parameter setting to be applied to a communication link is randomly determined according to a probability distribution. This probability distribution is such that a probability that a particular parameter setting is applied decreases with, on the one hand, a relative level of interference that the communication link is expected to experience from other communication links if the particular parameter setting is applied and, on the other hand, a relative level of interference that other communication links are expected to experience if the particular parameter setting is applied.

16 Claims, 4 Drawing Sheets

CONTROLLING A COMMUNICATION SYSTEM

FIELD OF THE INVENTION

An aspect of the invention relates to a method of controlling a communication system in which a plurality of communication entities can establish a plurality of communication links that can potentially interfere with each other. The method may be used, for example, in a cellular radio system that is based on CDMA, CDMA being an acronym for code division multiple access. Other aspects of the invention relate to a controlling entity for a communication system, and a device readable medium comprising a set of instructions.

BACKGROUND OF THE INVENTION

A communication system may allow and handle numerous communication links that simultaneously exist and operate. However, one communication link may cause interference in another communication link, and vice versa. Interference can occur because two or more communication links use a same channel, while these communication links are geographically close to each other. Interference may also occur between communication links that use different channels. Channels may not be orthogonal in the sense that a signal in one channel can cause a residue in another channel, and vice versa.

In case a communication link experiences interference, this will adversely affect data transmission capacity and, therefore, transmission delay. In this respect, a level of interference relative to a data-carrying signal is an important parameter, which will be referred to as a relative level of interference hereinafter. The higher the relative level of interference that a communication link experiences, the lower the data transmission capacity will be and, therefore, the larger the transmission delay will be. In a communication system, there is a potential risk that one or more communication links have relatively low data transmission capacities and thus relatively large transmission delays due to interference. This can occur while one or more other communication links have relatively high data transmission capacities and thus relatively small transmission delays. In general, it is preferred to avoid such an unbalanced situation.

The relative level of interference that a communication link experiences from another communication link, and vice versa, may be balanced by applying a different parameter setting to the one or the other communication link, or both. The different parameter setting may concern one or more parameters of these communication links, such as, for example, transmission power, channel assignment, and geometrical location through access point assignment, whichever is applicable. However, the different parameter setting, which balances the relative levels of interference in the two aforementioned communication links, may affect other communication links: interference in these communications links may increase. That is, achieving a balance between two communication links may create an unbalance, or may amplify an unbalance, between two or more other communication links. Adjusting parameter settings so as to achieve a system-wide balanced state, which provides fairness in terms of transmission capacity and delay, is a complex problem, in particular if there are many communication links. Complexity tends to grow exponentially with the number of communications links.

The article entitled "MAPEL: Achieving Global Optimality for a Non-Convex Wireless Power Control Problem" by L. Qian et al. published in IEEE Transactions on Wireless Communications Wireless, Vol. 8, no. 3, pp. 1553-1563, March 2009 describes a centralized solution. This solution is highly complex and can only be applied offline, which makes it impractical.

The article entitled "Distributed Interference Compensation for Wireless Networks" by J. Huang et al. published in IEEE Journal on Selected Areas in Communications, Vol. 24, no. 5, pp. 1074-1084, May 2006 describes a distributed solution based on game theory. However, this solution provides no guarantee that a system-wide optimal state is achieved in terms of transmission capacity fairness and transmission delay fairness.

SUMMARY OF THE INVENTION

There is a need for a practical solution that promotes a well-balanced, efficient operation of a communication system.

In order to better address this need, and in accordance with an aspect of the invention, a method of controlling a communication system is provided in which a plurality of communication entities can establish a plurality of communication links that can potentially interfere with each other, in which method the following step is repetitively carried out for respective communication links:

a probabilistic parameter setting step in which a parameter setting to be applied to a communication link, is randomly determined according to a probability distribution, whereby a probability that a particular parameter setting is applied decreases with, on the one hand, a relative level of interference that the communication link is expected to experience from other communication links if the particular parameter setting is applied and, on the other hand, a relative level of interference that other communication links are expected to experience if the particular parameter setting is applied.

Accordingly, respective local optimizations for respective communication links are carried out throughout the communication system. A local optimization tries to achieve two different goals: a selfish goal of decreasing the relative level of interference in the communication link concerned, and an altruistic goal of decreasing the relative level of interference in other, neighboring communication links. A local optimization thus seeks to locally strike a fair balance between these goals with a certain degree of randomness. Repetitively carrying out these local optimizations, which have a certain degree of randomness, brings about a convergence process. This drives the communication system to a system-wide balanced state that provides transmission capacity fairness and therefore transmission delay fairness throughout the communication system.

An embodiment of the invention advantageously comprises one or more of the following additional features, which are described in separate paragraphs. These additional features each contribute to a well-balanced, efficient operation of a communication system.

The probability distribution is advantageously in the form of the following expression:

$$PD = C \times \exp(-E + T),$$

wherein:
    PD represents the probability distribution,
    C represents a normalizing constant,
    exp represents an exponential function,
    T represents a probability distribution sharpness parameter; and E represents a cost function that is specific to a communication link, so that respective communication links have respective cost functions, a cost function of a communication link having as a variable at least one parameter of the communication link, the cost function comprising:

a first term representing the relative level of interference that the communication link is expected to experience from other, neighboring communication links; and a second term representing the relative level of interference that other, neighboring communication links are expected to experience.

The first term advantageously comprises a sum of:

a noise ratio, which is a ratio of noise power to received desired signal power, at a communication entity involved in the communication link; and an interference ratio, which is a ratio of received interference signal power and received desired signal power, at the communication entity involved in the communication link.

The second term advantageously comprises a sum of respective interference ratios at communication entities involved in other, neighboring communication links.

The probability distribution sharpness parameter T can be a non-negative constant.

Alternatively, the probability distribution sharpness parameter T can have a value that decreases over time at least during a time interval.

In that case, the value of the probability distribution sharpness parameter T advantageously decreases over time according to a function $T=1/\log(k+t)$; log representing a logarithmic function, k representing a real-value constant, t representing time.

The probabilistic parameter setting step is advantageously repetitively carried out for a communication link at randomly determined instants.

The probabilistic parameter setting step is advantageously carried out in association with a random time interval setting step, in which a time interval is randomly set, a subsequent probabilistic parameter setting step for the communication link being carried out when this randomly set time interval has expired.

The time interval is advantageously randomly set according to an exponential distribution.

In the communication system, respective communication links may be established between respective user terminals and respective access points, whereby several respective user terminals can jointly access the communication system via an access point over several respective channels. In that case, the parameter setting that is determined in the probabilistic parameter setting step advantageously concerns at least one of the following parameters of the communication link: transmission power, access point allocation, and channel allocation.

A setting of the transmission power advantageously involves a selection of a transmission power level among a set of transmission power levels.

In the communication system identified hereinbefore, respective access points advantageously repetitively carry out respective probabilistic parameter setting steps for respective communication links, whereby an access point repetitively carries out respective probabilistic parameter setting steps for respective communication links between the access point and respective user terminals, which jointly access the communication system via the access point.

The respective access points advantageously repetitively carry out the following two steps:

an interference data collecting step in which an access point collects interference data relating to respective interference ratios at respective user terminals that access the communication system via the access point; and an interference data communication step in which an access point transmits the interference data that has been collected to neighboring access points.

The interference data that the access point collects from a user terminal and advantageously comprises: a ratio of desired signal to undesired signal at the user terminal, a desired signal power received at the user terminal, and an interference signal power received at the user terminal.

Another aspect of the invention concerns a controlling entity for a communication system, the controlling entity being adapted to carry out the method defined hereinbefore.

Yet another aspect of the invention concerns a device readable medium comprising a set of instructions that enables a device, which is capable of executing the set of instructions, to carry out the method according as defined hereinbefore.

For the purpose of illustration of the invention summarized hereinbefore, as well as the additional features, a detailed description of particular embodiments is provided with reference to drawings.

DETAILED DESCRIPTION

Figure 1:
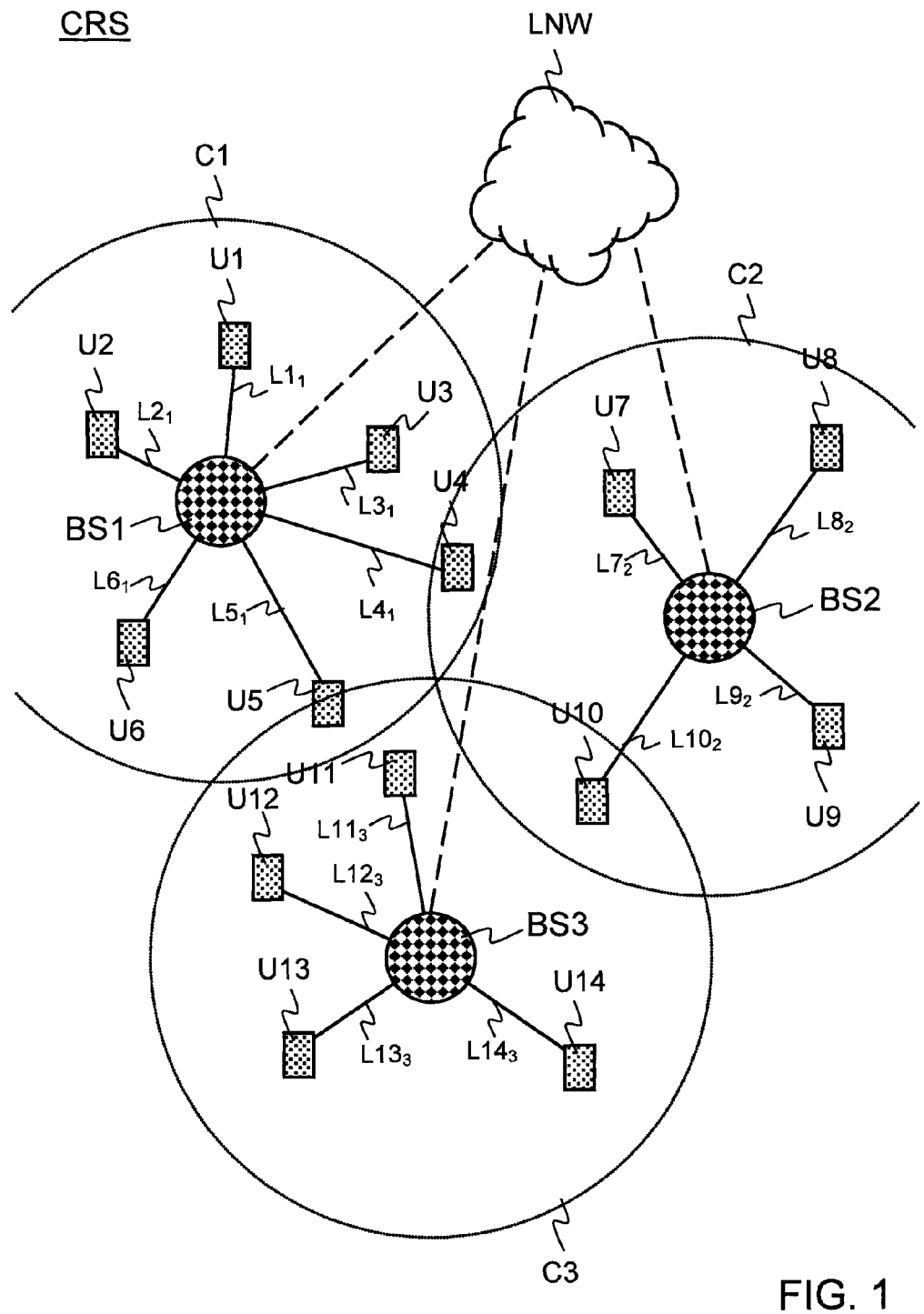
FIG. 1 is a conceptual diagram that illustrates a cellular radio system in which respective communication links have been established between respective user terminals and respective base stations.

FIG. 1 conceptually illustrates a cellular radio system CRS, which is an example of a communication system to which the invention can be applied. The cellular radio system CRS comprises different types of communication entities: base stations BS and user terminals U. In FIG. 1, fourteen user terminals U1-U14 and three base stations BS1-BS3 are represented by way of example. The cellular radio system CRS may comprise further base stations and further user terminals, which are not represented for the sake of simplicity and clarity. A landline network LNW communicatively couples the three base stations BS1-BS3 with each other.

The cellular radio system CRS basically operates as follows. The three base stations BS1-BS3 provide three different coverage areas, which partially overlap with each other. These three coverage areas may be regarded as three cells C1-C3 of the cellular radio system CRS as illustrated in FIG. 1. A user terminal that is within a coverage area of a base station can communicate via the cellular radio system CRS by means of a communication link with this base station. A base station may therefore be regarded as an access point: a point via which a user terminal can access the cellular radio system CRS.

FIG. 1 illustrates a case where user terminals U1-U6 communicate via the cellular radio system CRS by means of communication links $L1_1$-$L6_1$, respectively, with base station BS1 in cell C1. User terminals U7-U10 communicate via the cellular radio system CRS by means of communication links $L7_1$-$L10_1$, respectively, with base station BS2 in cell C2. User terminals U11-U14 communicate via the cellular radio system CRS by means of communication links $L11_1$-$L14_1$, respectively, with base station BS3 in cell C3.

It should be noted that some user terminals are located in more than one cell. User terminal U4 is also in cell C2 of base station BS2. User terminal U4 could therefore also communicate via the cellular radio system CRS by means of a communication link with base station BS2. That is, user terminal U4 can switch base stations. User terminals U5 and U10 can also switch base stations. User terminal U5 could also communicate via the cellular radio system CRS via base station BS3 in cell C3. User terminal U10 could also communicate via the cellular radio system CRS via base station BS3 in cell C3.

A communication link between a user terminal and a base station is established over a particular uplink channel and a particular downlink channel. The user terminal transmits messages to base station via the uplink channel. The user terminal receives messages from the base station via the downlink channel.

Base station BS1 can assign respective uplink-downlink channel pairs to the respective communication links $L1_1$-$L6_1$ with the respective user terminals U1-U6. Respective uplink channels and respective downlink channels may correspond with respective codes in a code division multiple access (CDMA) modulation scheme. Similarly, base station BS2 can assign respective uplink-downlink channel pairs to the respective communication links $L7_1$-$L10_1$ with the respective user terminals U7-U10. Base station BS3 can assign respective uplink-downlink channel pairs to respective the respective communication links $L11_1$-$L14_1$ with the respective user terminals U11-U14.

A communication link may cause interference in another communication link, and vice versa. Interference may be intra-cell or inter-cell. There is intra-cell interference when two or more communication links in a single cell interfere with each other. That is, there is intra-cell interference when a communication link between a user terminal and a base station causes interference in another communication link between another user terminal and the same base station. There is inter-cell interference with a communication link in a cell interferes with a communication link in another cell. That is, there is inter-cell interference when a communication link between a user terminal and a base station causes interference in another communication link between another user terminal and the same base station.

Intra-cell interference may occur even if each communication link within a cell uses a unique uplink channel and a unique downlink channel, which no other communication link in the cell concerned use. In that case, channels are not orthogonal: a signal in one channel can produce a residue in another channel. A non-orthogonality factor can be assigned to a pair of channels: the higher non-orthogonality factor is, the stronger the aforementioned residue will be, all other parameters being equal. The non-orthogonality factor may depend on, for example, signal propagation characteristics, which may vary from one location to another and which may vary with time. In the sequel, it will be assumed that, in an uplink-downlink channel pair, the uplink channel and the downlink channel are orthogonal. That is, the non-orthogonality factor is assumed to be equal to zero in an uplink-downlink channel pair.

Inter-cell interference typically occurs if two communication links in two neighboring cells use the same channel. The closer the two communication links are located to each other, the stronger the interference will be, all other parameters being equal. Inter-cell interference may also occur if two communication links in two neighboring cells use two different channels. Namely, inter-cell interference may occur if the two channels are not orthogonal, which implies that the non-orthogonality factor for the two channels is not equal to zero. The higher non-orthogonality factor is, the stronger this type of inter-cell interference will be, all other parameters being equal.

Figure 2:
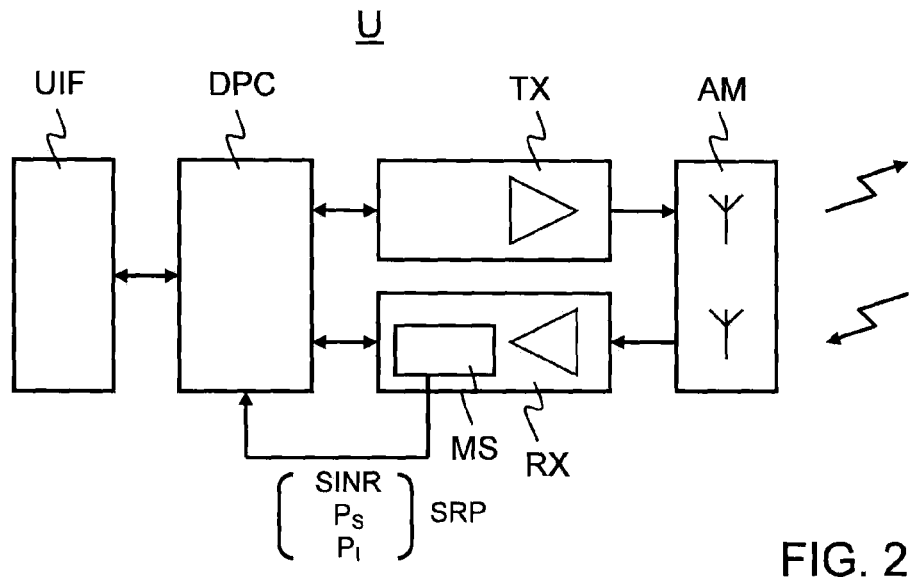
FIG. 2 is a block diagram that illustrates a user terminal that can establish a communication link with a base station of the cellular radio system.

FIG. 2 schematically illustrates a user terminal U, which can be regarded as representative of the user terminals U1-U14 illustrated in FIG. 1. The user terminal U illustrated in FIG. 2 can thus correspond with any of the user terminals U1-U14 illustrated in FIG. 1. The user terminal U comprises various functional entities: a user interface UIF, a data and control processor DPC, a radio transmitter TX, a radio receiver RX, and an antenna module AM. The user interface UIF typically comprises some hardware modules, such as, for example, a display device and a set of buttons, and may further comprise one or more software modules. The data and control processor DPC may comprise, for example, one or more suitably programmed general-purpose processors, as well as dedicated processors and circuits. The radio transmitter TX and the radio receiver RX typically comprise signal generating and processing circuits, such as, for example, an oscillator circuit, a mixer circuit, a filter circuit, amplifier circuit, an analog and digital conversion circuit, and a digital to analog conversion circuit. The radio transmitter TX of the radio receiver RX may further comprise one or more software modules for carrying out one or more signal processing functions. The radio transmitter TX and the radio receiver RX may share circuits and software modules.

The user terminal U basically operates as follows. It is assumed that, in an initial communication phase, the cellular radio system CRS has granted the user terminal U access. In this phase, the user terminal U obtains information regarding a communication link to be established with a base station, in particular an uplink-downlink channel pair that is assigned to the communication link. The data and control processor DPC causes the radio transmitter TX to operate in the uplink channel of the uplink-downlink channel pair, and causes the radio receiver RX to operate in the downlink channel. The user terminal U establishes a communication link with the base station concerned over the uplink-downlink channel pair until further notice. That is, the radio transmitter TX transmits messages to the base station via the uplink channel. The radio receiver RX receives messages from the base station via the downlink channel.

The user terminal U may receive an instruction to change channel, that is, to continue the communication link over another uplink-downlink channel pair. The user terminal U may also receive an instruction to change base station that is, to effectively replace the communication link by another communication link with another base station, which may involve a channel change. In either case, the data and control processor DPC causes the radio transmitter TX and radio receiver RX to implement the channel change or the base station change, or both, whichever applies. In the sequel, a base station change will be regarded as applying a different parameter setting to a communication link: a base station assignment parameter is given a different value.

The radio transmitter TX transmits messages to the base station with a transmission power that advantageously can be controlled. The data and control processor DPC may then control power the transmission power on the basis of specific communication control messages received from the base station. The data and control processor DPC may set the transmission power to a level selected from a discrete set of possible transmission power levels.

The radio receiver RX comprises a signal measurement module MS, which can measure various signal reception parameters SRP. The signal measurement module MS can measure a ratio of desired signal to undesired signal SINR. In this ratio SINR, the desired signal is a signal received from the base station in the downlink channel of interest. The undesired signal is a sum of noise and interference received in the downlink channel. The interference received is due to intra-cell and inter-cell interference, which have been discussed hereinbefore.

The signal measurement module MS can further measure a desired signal power $P_S$, which is a power of the signal received from the base station in the downlink channel of interest. The signal measurement module MS can yet further measure an interference signal power $P_I$, which is the power of all signals received from other base stations in the downlink channel of interest. For example, a communication link in a neighboring cell that uses the same downlink channel, will account for at least a portion of the interference signal power $P_I$. A communication link in a neighboring cell that uses a different downlink channel, but which is not orthogonal with the downlink channel of interest, will also account for a portion of the interference signal power $P_I$.

The signal measurement module MS in the radio receiver RX communicates the aforementioned measured signal reception parameters SRP to the data and control processor DPC. The data and control processor DPC regularly prepares messages that comprise these measured signal reception parameters SRP as most recently communicated by signal measurement module MS. Upon preparation of such a message, the data and control processor DPC causes the radio transmitter TX to transmit the message to the base station. Accordingly, the user terminal U regularly provides the base station with a current status of the signal reception parameters SRP, which include: the ratio of desired signal to undesired signal SINR, the desired signal power $P_S$, and the interference signal power $P_I$.

Figure 3:
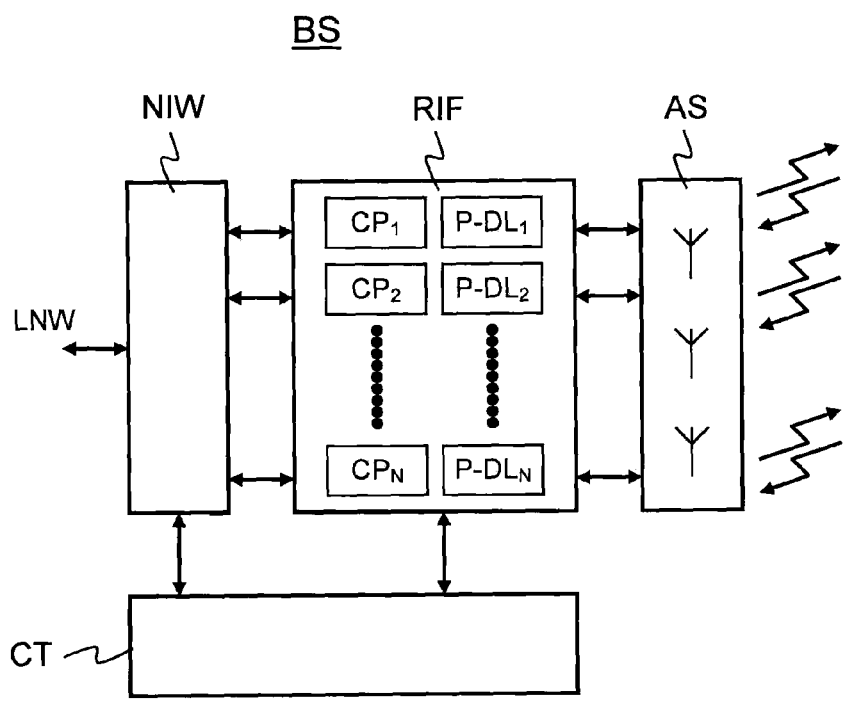
FIG. 3 is a block diagram that illustrates a base station of the cellular radio system that can establish respective communication links with respective user terminals.

FIG. 3 schematically illustrates a base station BS, which can be regarded as representative of the base stations BS1-BS3 illustrated in FIG. 1. The base station BS illustrated in FIG. 3 can thus correspond with any of the base stations BS1-BS3 illustrated in FIG. 1. The base station BS comprises various functional entities: a network interface NIW, a radio interface RIF, an antenna assembly AS, and a controller CT. The network interface NIW communicatively couples the base station BS to the landline network LNW and typically comprises message routing modules, multiplexing, and demultiplexing modules. The radio interface RIF comprises signal generating and processing circuits, which typically comprise multiplex modulation/demodulation modules. Any of the aforementioned modules may at least partially be implemented by means of software, that is, instructions that are stored in a device readable medium, which enable an instruction-executing device to carry out a function related to the module concerned. The controller CT may comprise, for example, one or more suitably programmed general-purpose processors, as well as dedicated processors and circuits.

The base station BS basically operates as follows. The radio interface RIF is capable of simultaneously handling N respective communication links that use N uplink-downlink channel pairs $CP_1$, $CP_1$, ..., $CP_N$ as illustrated in FIG. 3. To that end, the radio interface RIF may apply a CDMA scheme that comprises 2N different codes, N respective codes for N uplink channels and N further respective codes for N downlink channels. The controller CT assigns a particular uplink channel and a particular downlink channel, which form an uplink-downlink channel pair, to a particular communication link with a particular user terminal. In effect, the controller CT thus instructs the radio interface RIF to receive messages from the user terminal concerned in the uplink channel that has been assigned to the user terminal U. The controller CT further instructs the radio interface RIF to transmit messages to the user terminal concerned in the downlink channel that has been assigned to the user terminal U. The radio interface RIF transmits these messages with a transmission power that is preferably controllable.

The controller CT can further control the transmission power with which the radio interface RIF transmits messages in the downlink channel of a particular communication link with a particular user terminal U. That is, the transmission power in the downlink channel of a communication link can be controlled independently of the transmission power in the downlink channel of any other communication link. Accordingly, the radio interface RIF can operate at N respective transmission power levels $P\text{-}DL_1$, $P\text{-}DL_2$, ..., $P\text{-}DL_N$ for the N respective downlink channels of the N respective communications links as illustrated in FIG. 3. This does not exclude that two or more transmission power levels in two or more downlink channels may be equal. The controller CT may set the transmission power in a downlink channel to a level selected from a discrete set of possible transmission power levels.

The controller CT can thus control various parameters relating to a communication link between the base station BS and a particular user terminal. These parameters include the uplink channel and the downlink channel that are assigned to the communication link, and the transmission power in the downlink channel that has been assigned to the communication link. The controller CT may also control the transmission power in the uplink channel by transmitting a message to the user terminal concerned instructing the user terminal to apply a particular transmission power level in the uplink channel.

The controller CT may further determine that the user terminal should change base station. The communication link should then be replaced by another communication link between the user terminal concerned and another base station. As mentioned hereinbefore, such a base station change is regarded as applying a different parameter setting to the communication link. A base station change may be decided upon by another control entity in the cellular radio system CRS, or the base station concerned may make such a decision jointly with another control entity.

The controller CT controls at least one of the aforementioned parameters relating to a communication link on the basis of estimations, or rather expectancies. These estimations concern, on the one hand, a relative level of interference that the communication link will experience and, on the other hand, relative levels of interference that other communication links will experience. As mentioned hereinbefore, a relative level of interference that a communication link experiences, is a level of interference relative to a data-carrying signal in the communication link. More precisely, the controller CT controls a communication link parameter on the basis of expectancies concerning relative levels of interference in a non-deterministic fashion. There is a degree of randomness.

More precisely, the controller CT randomly determines a set of parameter values, which apply one or more of the aforementioned parameters, according to a probability distribution. The probability distribution assigns a probability to a particular set of parameter values that depends on two factors. A first factor involves a relative level of interference that the communication link is expected to experience from other communication links if the particular set of parameter values is applied. A second factor involves a relative level of interference that other communication links are expected to experience if the particular set of parameter values is applied. The first factor can be regarded as a "selfish" factor, which favors a low relative level of interference for the communication link concerned. The second factor can be regarded as an "altruistic" factor, which favors low relative levels of interference for other communication links The probability distribution, which comprises these two factors, thus expresses a drive towards a balanced, fair state in which the communication link concerned, as well as other communication links, experience relatively low relative levels of interference.

The controller CT can quantify the aforementioned "selfish" factor of the probability distribution on the basis of the ratio of desired signal to undesired signal SINR that the user terminal concerned has reported. For example, let it be assumed that the ratio of desired signal to undesired signal SINR is equal to X, X being an integer value, which may be expressed in decibel units. The controller CT can then expect the ratio of desired signal to undesired signal SINR to become equal to 2 times X, or X+3 if expressed in decibel units of power, in case the controller CT instructs the radio interface RIF to double the transmission power in the downlink channel concerned.

The aforementioned ratio of desired signal to undesired signal SINR, which the user terminal concerned reports, concerns the downlink channel. The controller CT can obtain a similar ratio concerning the uplink channel from the radio interface RIF in the base station BS. To that end, the radio interface RIF may comprise respective signal measurement module for respective uplink channels. These signal measurement module may be functionally similar to the signal measurement module MS in the radio receiver RX of the user terminal illustrated in FIG. 2. The controller CT may then obtain a measured ratio of desired signal to undesired signal in the uplink channel from the radio interface RIF. The controller CT may use this measured ratio for estimating a desired signal to undesired signal ratio that will be obtained in the uplink channel if the base station BS instructs the user terminal to adjust the transmission power.

The controller CT can quantify the aforementioned "altruistic" factor of the probability distribution on the basis of information indicating relative levels of interference that the communication link concerned causes in other communication links. In this regard, the "altruistic" factor can be divided in two components: an intra-cell interference component and an intra-cell interference component. The intra-cell interference component accounts for relative levels of interference in other communication links that are within the same cell as the communication link concerned. The inter-cell interference component accounts for relative levels of interference in other communication links that are within neighboring cells.

The controller CT can quantify the intra-cell interference component of the altruistic factor on the basis of respective transmission powers used in respective downlink channels, as well as respective transmission powers used in respective uplink channels. The controller CT further quantifies the intra-cell interference component on the basis of non-orthogonality factors between downlink channels and non-orthogonality factors between uplink channels. Quantification of intra-cell interference in uplink channels may further be based on respective signal reception parameters that respective user terminals in the cell concerned have reported.

The controller CT can quantify the inter-cell interference component of the altruistic factor on the basis of information obtained from other, neighboring base stations. Another, neighboring base station, which provides communication links in another, neighboring cell, can indicate relative levels of interference that these communication links experience as a result of the communication links that the base station BS of interest provides in the cell of interest. The other, neighboring base station can provide such an indication on the basis of respective signal reception parameters that respective user terminals in the other, neighboring cell have reported. Quantification of the inter-cell interference component of the altruistic factor thus typically involves information exchanges between base stations regarding this type of interference. This will be described in greater detail hereinafter.

Figure 4:
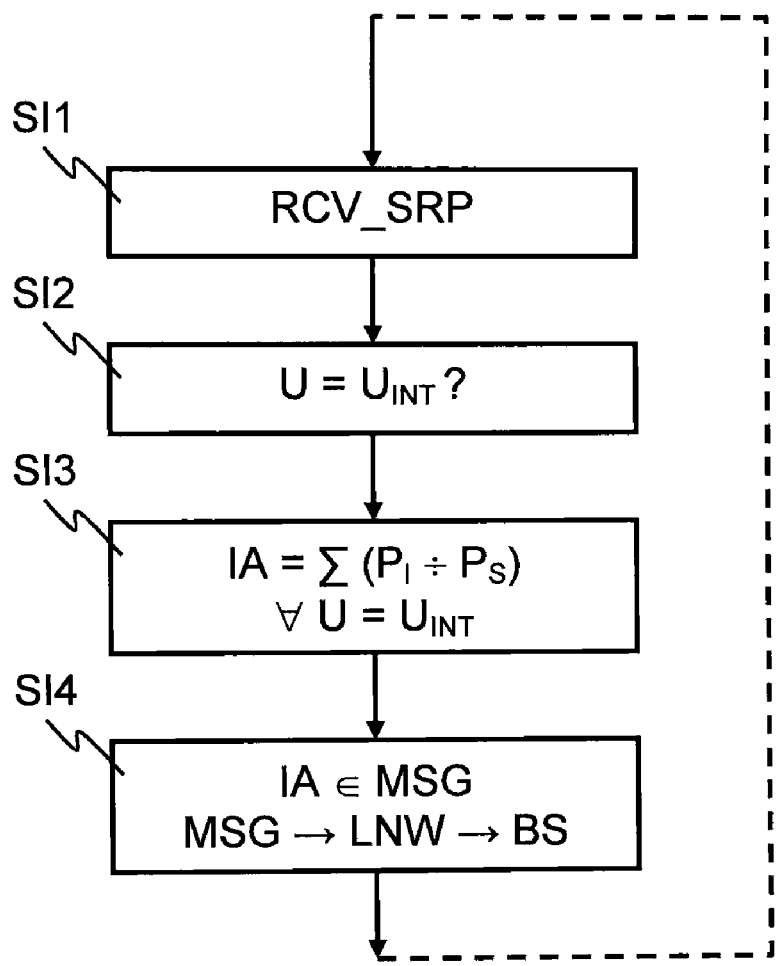
FIG. 4 is a flow chart diagram that illustrates a series of steps that the base station repetitively carries out for providing another base station with information relating to inter-cell interference.

FIG. 4 illustrates a series of steps SI1-SI4 that the base station BS illustrated in FIG. 3 repetitively carries out for providing other base stations with information relating to inter-cell interference that these base stations cause. As mentioned hereinbefore, the base station BS illustrated in FIG. 3 can be regarded as representative of the base stations BS1-BS3 in the cellular radio system CRS illustrated in FIG. 1. Consequently, each base station in the cellular radio system CRS may carry out the series of steps SI1-SI4 illustrated in FIG. 4. In that case, there will be a comprehensive exchange of information relating to the intra-cell interference throughout the cellular radio system CRS. It should be noted that FIG. 4 is an example that concerns inter-cell interference between downlink channels only, for reasons of simplicity and conciseness.

In step SI1, the base station receives respective signal reception parameters that respective user terminals report (RCV_SRP). The base station may temporarily store these respective signal reception parameters in a buffer. In the buffer, the most recently received signal reception parameters may replace previously received signal reception parameters. The buffer thus comprises the desired signal power $P_S$ and the interference signal power $P_I$ that a user terminal has most recently reported. These signal reception parameters are available for each user terminal that reports to the base station.

In step SI2, the base station determines whether a user terminal should be considered as an interference-experiencing user terminal, or not ($U=U_{INT}$?). To that end, the base station compares the interference signal power $P_I$, which a user terminal has most recently reported, with a threshold value. The base station considers the user terminal concerned to be an interference-experiencing user terminal only in case the interference signal power $P_I$ is above the threshold value. The base station can make this determination for each user terminal that has reported to the base station. The base station need not make the determination anew for a user terminal as long as a user terminal reports identical signal reception parameters. Thus, in effect, in step SI2, the base station defines a set of interference-experiencing user terminals, which includes user terminals that experience a relatively high relative level of interference.

In step SI3, the base station determines an aggregate ratio of interference to desired signal ($IA=\Sigma(P_I \div P_S) \forall U=U_{INT}$). To that end, the base station determines a ratio of interference to desired signal for each interference-experiencing user terminal. The base station determines this ratio by dividing the interference signal power $P_I$ by the desired signal power $P_S$ that the interference-experiencing user terminal has reported. The aggregate ratio of interference to desired signal is a sum of the respective ratios of interference to desired signal that have been determined for the respective interference-experiencing user terminals. It may happen that the respective interference signal powers and the respective desired signal powers that the respective interference-experiencing user terminals have reported, have not changed with respect to a previous reporting. In that case, the base station may simply copy, as it were, the aggregate ratio of interference to desired signal that was determined for the previous reporting.

In step SI4, base station creates a message indicating the aggregate ratio of interference to desired signal (IA ∈ MSG). The base station sends this message to the other, neighboring base stations via the landline network LNW illustrated in FIG. 1 (MSG→LNW→BS). Accordingly, the other, neighboring base stations receive an indication concerning inter-cell interference. Another, neighboring base station can use this indication for controlling one or more parameters of the communication links in the cell that this base station services. It may happen that the aggregate ratio of interference to desired signal has not changed with respect to that indicated in a previous message. In that case, the base station may send a message referring to the previous message, or may abstain from sending a message indicating the aggregate ratio of interference to desired signal. The other, neighboring base stations may then infer from this silence that the aggregate ratio of interference to desired signal has not changed.

The base station BS illustrated in FIG. 3 thus obtains intra-cell information and inter-cell information relating to interference. The intra-cell information comprises signal reception parameters that user terminals in the cell concerned report. The intra-cell information comprises aggregate ratios of interference to desired signal that other, neighboring base stations report as described hereinbefore with reference to FIG. 4.

The base station can use the aforementioned intra-cell information and the intra-cell information for establishing respective cost functions for respective communication links in the cell concerned. A cost function that the base station establishes for a communication link comprises one or more parameters of a communication link as one or more variables. The cost function provides a particular cost value if each variable is assigned a specific value. This cost value constitutes a metric of system performance as seen from the communication link concerned. The cost function can thus quantify system performance in a local area around the communication link concerned. A cost function for a communication link can therefore be regarded as a "local" cost function.

More specifically, the cost function for a communication link comprises two terms: a "selfish" term and an "altruistic" term. These terms can be regarded as corresponding with the "selfish" factor and the "altruistic" factor, respectively, on which the probability distribution depends as mentioned hereinbefore. The "selfish" term represents a relative level of interference that the communication link is expected to experience from other, neighboring communication links. The "altruistic" term represents a relative level of interference that neighboring communication links are expected to experience.

The following is an example of a cost function for the downlink channel of a communication link. For the sake of simplicity and clarity, it is assumed the cost function comprises a single parameter as variable, namely the transmission power in the downlink channel. The cost function can then be expressed as:

$$E(P)=A \div P + B \times P$$

wherein E(P) represents the cost function, P represents the transmission power in the downlink channel, A represents a coefficient for the "selfish" term, and B represents a coefficient for the "altruistic" term. The "selfish" term is thus $A \div P$. The "altruistic" term is $B \times P$. The higher the transmission power P is, the lower the "selfish" term of the cost function is, because the relative level of interference in the downlink channel of the communication link of interest decreases. Conversely, the higher the transmission power P is, the higher "altruistic" term is, because the relative level of interference in downlink channels of other, neighboring communication links increases.

The base station can determine the "selfish" coefficient A on the basis of the ratio of desired signal to undesired signal SINR that the user terminal concerned, which uses the downlink channel, has reported. The base station obtains the "selfish" coefficient A by dividing a currently applied transmission power level in the downlink channel by the aforementioned ratio. Namely, the ratio of desired signal to undesired signal SINR that the user terminal has reported was measured while the currently applied transmission power level applied.

The base station can determine the "altruistic" coefficient B in the following manner. The base station determines an intra-cell component of this coefficient on the basis of locally available information. The base station further determines an intra-cell component on the basis of aggregate ratios of interference to desired signal that other, neighboring base stations have reported as described hereinbefore with reference to FIG. 4. The base station then calculates a sum of the intra-cell component and the intra-cell component of the "altruistic" coefficient B.

In more detail, the intra-cell component of the "altruistic" coefficient B is a sum of respective quotients of orthogonality factors and applied transmission power levels for respective downlink channels of other communication links in the cell concerned. Such a quotient can be expressed as:

$$\alpha(u,v) \div P_v$$

wherein $\alpha(u,v)$ represents the orthogonality factor for a pair of downlink channels (u, v), u representing the downlink channel of the communication link of interest, v representing the downlink channel of another communication link in the same cell, $P_v$ representing a currently applied transmission power level in the other communication link denoted as v.

The inter-cell component of the "altruistic" coefficient B is a sum of the aggregate ratios of interference to desired signal that other, neighboring base stations have reported, each ratio being divided by the currently applied transmission power level in the downlink channel of the communication link of interest. The "altruistic" coefficient B can thus be expressed as:

$$B = \Sigma \alpha(u,v) \div P_v + \Sigma IA(c) \div P_u$$

wherein $\Sigma \alpha(u,v) \div P_v$ represents the intra-cell component, which is the sum of respective quotients of orthogonality factors $\alpha(u,v)$ and applied transmission power levels $P_v$ for respective downlink channels of other communication links in the cell concerned, $\Sigma IA(c) \div P_u$ represents the inter-cell component, which is the sum of the aggregate ratios of interference to desired signal that other, neighboring base stations have reported, each ratio being divided by the currently applied transmission power level in the downlink channel of the communication link of interest. The aggregate ratio of interference to desired signal that a base station "c" has reported, is expressed as IA(c). The currently applied transmission power level in the downlink channel is expressed as $P_u$.

The following is another example of a cost function for the downlink channel of a communication link. This example is obtained by introducing another parameter in the example described hereinbefore, namely base station assignment. As illustrated in FIG. 1, user terminals U4, U5, and U10 are located so that these can be assigned to more than one base station. For example, it may be advantageous to assign user terminal U4 to base station BS2 instead of base station BS1. Base station BS1 is handling relatively many communication links, whereas base station BS2 is handling relatively few communication links. Overall system performance may therefore improve by assigning user terminal U4 to base station BS2 instead of base station BS1.

In this more elaborate example, the cost function includes as a variable a base station from a set of candidate base stations. The set of candidate base stations for the cost function, which relates to a particular user terminal, can be defined as follows. In case the user terminal concerned receives a signal from a base station that is above a given threshold, this base station is included in the set of candidate base station.

The cost function of the more elaborate example can be expressed as:

$$E(b,P)=A(b)\div P+B(b)\times P$$

wherein E(b, P) represents the cost function, P represents the transmission power, A(b) represents a "selfish" coefficient for a particular candidate base station "b" and B represents an "altruistic" coefficient for the particular candidate base station "b". It should be noted that determining these coefficients requires a more elaborate collection and reporting of signal reception parameters. For example, the user terminal should preferably measure signal reception parameters for each candidate base station. The user terminal may then report these measured signal parameters to the base station to which the user terminal is currently assigned. This base station should then preferably also receive aggregate ratios of interference to desired signal that have been reported to candidate base stations.

Figure 5:
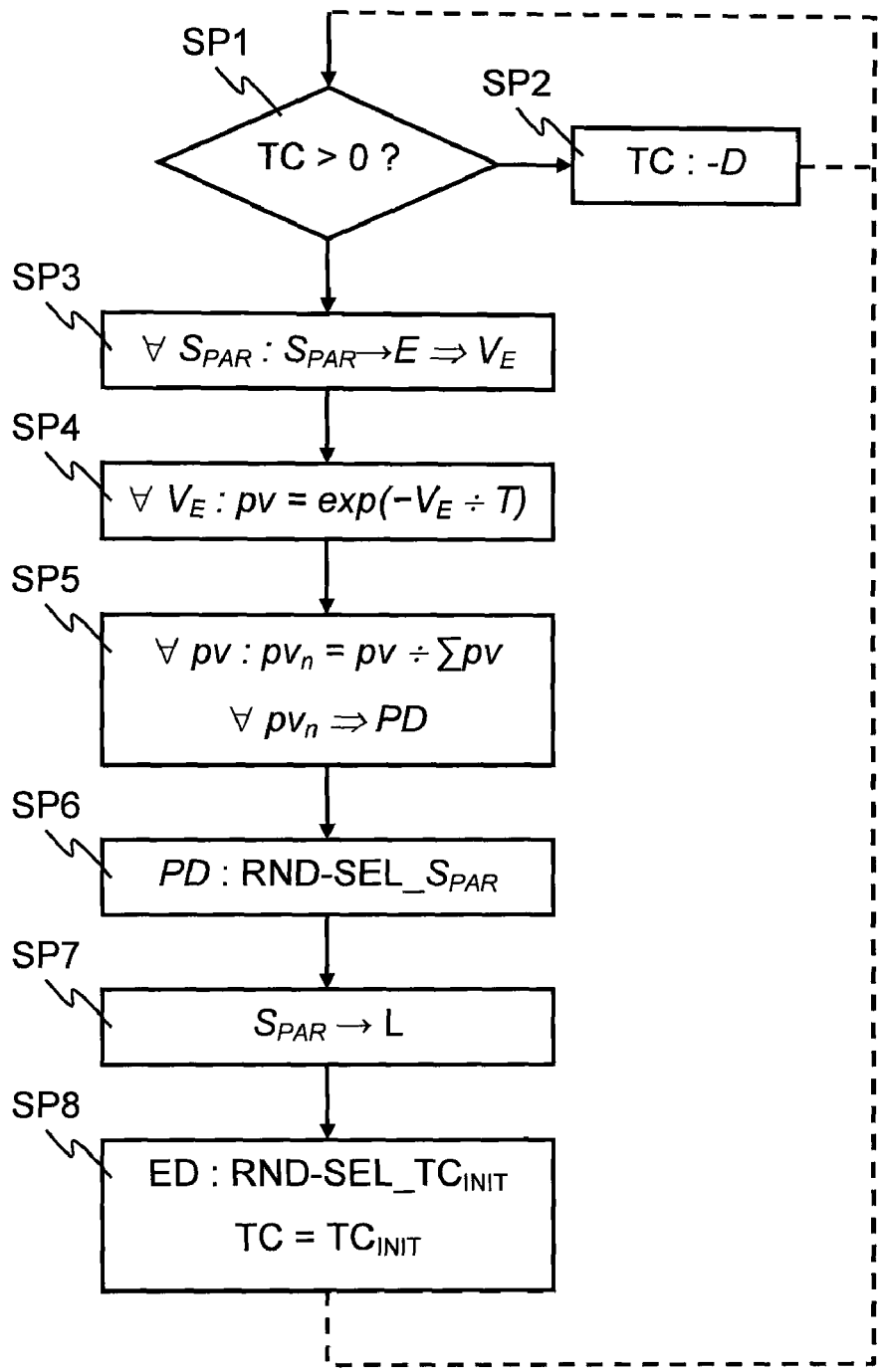
FIG. 5 is a flow chart diagram that illustrates a series of steps that the base station repetitively carries out for determining respective parameter settings for respective communication links.

FIG. 5 illustrates a series of steps SP1-SP8 that the base station BS illustrated in FIG. 3 repetitively carries out for controlling communication parameters. As mentioned hereinbefore, the base station BS illustrated in FIG. 3 can be regarded as representative of the base stations BS1-BS3 in the cellular radio system CRS illustrated in FIG. 1. Consequently, each base station in the cellular radio system CRS may carry out the series of steps SP1-SP8 illustrated in FIG. 5. This will cause a system-wide optimization particularly in terms of achieving relatively high data transmission capacity and relatively low transmission delays.

The base station carries out the series of steps SP1-SP8 illustrated in FIG. 5 for each user terminal with which the base station maintains a communication link. Stated otherwise, the base station carries out the series of steps SP1-SP8 for each communication link that the base station manages in the cellular radio system CRS. Moreover, the base station regularly carries out the series of steps SP1-SP8 for each communication link. It is assumed that the base station carries out the series of steps SP1-SP8 every D seconds for each communication link, D being a real positive value. The series of steps SP1-SP8 involves a time count for each communication link, which is initially set to a randomly selected value. The series of steps SP1-SP8 further involves a cost function as described hereinbefore, which the base station establishes for each communication link.

In step SP1, the base station checks whether or not the following condition applies: the time count for the communication link of interest has a value that is greater than zero (TC>0?). If the aforementioned condition applies, the base station carries out step SP2. In step SP2, the base station decrements the value of the time count with D, corresponding to a delay after which the series of steps SP1-SP8 will be carried out anew. Once step SP2 has been carried out, the series of steps SP1-SP8 has been completed according to a first branch, which can be designated as a countdown branch. Step SP1 will be carried out anew for the communication link concerned after D seconds. If the aforementioned condition does not apply, which implies that the value of the time count is less than zero or equal thereto, the base station carries out step SP3 and steps SP4-SP8 subsequent thereto.

In step SP3, the base station applies respective sets of parameters values to the cost function ($\forall\ S_{PAR}: S_{PAR} \to E \Rightarrow V_E$). For each set of parameter values, the base station calculates a cost value that the cost function provides. A set of parameter values may each comprise one or more parameters values, each applying to a different parameter of the communication link concerned. For example, each set of parameter values may comprise a transmission power level only, which applies to the transmission power in the downlink channel. In that case, the cost function has one variable only, namely the transmission power in the downlink channel. As another example, each set of parameter values may comprise a transmission power level and a candidate base station, which apply to the transmission power in the downlink channel and a base station assignment, respectively. In that case, the cost function has two variables. The cost function may comprise a further, third variable in the form of a channel assignment. In any case, step SP3 provides a set of cost values, each applying to a particular set of parameters of the transmission link concerned.

In step SP4, the base station calculates respective probability values for respective sets of parameters values ($\forall\ V_E: pv=\exp(-V_E \div T)$). The base station may calculate a probability value according to the following equation:

$$pv=\exp(-V_E \div T)$$

wherein pv represents the probability value for a set of parameter values, exp represents an exponential function, $V_E$ represents the value that the cost function provides for this set of parameter values, and T represents a probability distribution sharpness parameter. It should be noted that the base station has calculated respective values $V_E$ for respective sets of parameter values in step SP3 described hereinbefore. In step SP4, the base station thus converts, as it were, these respective values $V_E$ into respective probability values pv.

The probability distribution sharpness parameter T may be a non-negative constant. Alternatively, the probability distribution sharpness parameter T may have a value that decreases over time at least during a time interval. In this time interval, the probability distribution sharpness parameter will have a lower value each time step SP4 is carried out. For example, the value of probability distribution sharpness parameter T may advantageously decrease over time according to a function T=1/log (k+t), log representing a logarithmic function, k representing a real-value constant, and t representing time.

In step SP5, the base station calculates respective normalized probability values for respective sets of parameters values ($\forall\ pv: pv_n=pv \div \Sigma pv$). In order to do so, the base station may first calculate a sum of the respective probability values that have been calculated for these respective sets of parameter values in step SP4. The base station obtains a normalized probability value by dividing a probability value that has been calculated in step SP4 by the sum of the respective probability values. Consequently, a normalized probability value is comprised between 0 and 1. Summing together the respective normalized probability values will produce a sum equal to 1. Multiplying a normalized probability value by 100% thus provides a percentage probability value.

It should be noted that the respective normalized probability values jointly constitute a probability distribution ($\forall$ pv$_n$ $\Rightarrow$ PD). The probability distribution can be expressed as:

$$PD = C \times \exp(-E \div T)$$

wherein PD represents the probability distribution, C represents a normalizing constant, exp represents an exponential function, E represents the cost function, and T represents the probability distribution sharpness parameter. In effect, step SP5 can be regarded as a calculation of the normalizing constant C. The normalizing constant C is preferably so that an integral of the probability distribution is equal to 1.

In step SP6, the base station randomly selects a set of parameters values according to the probability distribution (PD: RND-SEL$_{SPAR}$). That is, in this random selection, a set of parameter values has a probability of being selected that is defined by the normalized probability value, which has been calculated for the set of parameter values. For example, let it be assumed that a set of parameter values has a normalized probability value that is equal to 0.05. In that case, this set of parameter values has 5% chance of being selected. It should be noted that the lower the cost value for a set of parameters is according to the cost function, the higher the probability will be that this set of parameters is selected. Conversely, a relatively high cost value will result in a relatively low probability of being selected.

In step SP7, the base station applies to the communication link of interest the set of parameters values that has been selected in step SP6 (S$_{PAR}$→L). In case step SP6 has previously been carried out, the set of parameter values that has currently been selected replaces the set of parameter values that has previously been selected. In step SP7, the communication link may thus undergo a modification in terms of parameter setting. For example, the transmission power in the downlink channel may be increased or decreased. Such a modification will affect the relative level of interference that the communication link of interest experiences, as well as the relative level of interference that other, neighboring communication links experience. This change in interference conditions will be taken into account when the series of steps SP1-SP8 is subsequently carried out for other communication links, as well as when the series of steps SP1-SP8 is carried out anew the communication link of interest. By that time, further changes in interference conditions will have occurred due to modifications in parameter setting that other communication links have undergone.

In step SP8, the base station randomly determines a new initial value for the time count for the communication link of interest (ED: RND-SEL_TC$_{INIT}$; TC=TC$_{INIT}$). The new initial value may advantageously be determined according to an exponential distribution. The new initial value defines a time interval after which steps S3-S8 will be carried out anew for the communication link of interest. The base station thus randomly sets this time interval according to an exponential distribution. The parameters of the communication link concerned are thus regularly updated at randomly chosen instants on a time grid of D seconds. Step SP8 account for this random choice of updating instants.

Once step SP8 has been carried out, the series of steps SP1-SP8 has been completed according to a second branch, which can be designated as a parameter control branch. Step SP1 will be carried out anew for the communication link concerned after D seconds.

FIGS. 4 and 5 may each be regarded as a flowchart representation of a set of instructions, that is, software, which enables the base station to carry out various operations described hereinafter with reference to FIGS. 4 and 5, respectively. More specifically, the controller CT of the base station BS illustrated in FIG. 3 may carry out these operations by executing the set of instructions, which is stored in a memory. In general, the set of instructions may be comprised in a device readable medium, which may be in the form of, for example, a data carrier. The device readable medium comprising the set of instructions may be commercialized in association with a base station, or another entity of a cellular radio system that can carry out a control function.

The carrying out of the steps SP3-SP8 for a particular communication link can be regarded as a local optimization. This local optimization is based on a local cost function, which is the cost function for the communication link concerned. This cost function is such that a relatively high relative level of interference in the communication link itself or in other communication links, results in a relatively high cost value. That is, the cost function penalizes a relatively high relative level of interference, irrespective of where this is expected to occur in the cellular radio system CRS.

The local optimization has a certain degree of randomness but is biased towards minimizing the local cost function. In effect, the probability distribution sharpness parameter T defines the degree of randomness and expresses a degree of bias towards minimizing the local cost function. Minimizing the local cost function implies striking a fair balance between, on the one hand, a relative level of interference in the communication link of interest, which is a selfish goal, and, on the other hand, a relative level of interference in other, neighboring communication links, which is an altruistic goal.

As mentioned hereinbefore, the series of steps SP1-SP8 illustrated in FIG. 5 and described hereinbefore are repetitively carried out for the respective communication links in the cellular radio system CRS illustrated in FIG. 1. Accordingly, respective local optimizations are repetitively carried out throughout the cellular radio system CRS. In this regard, the repetitive carrying out of step SP6 for respective communication links throughout the cellular radio system CRS can be regarded as a Gibbs sampling process.

The repetitive carrying out of the respective local optimizations drives the cellular radio system CRS to a desired state in which a system-wide fair balance is achieved between respective relative levels of interference that respective communication links experience. This is a convergence process that depends on the probability distribution sharpness parameter T mentioned hereinbefore. A fair balance in terms of interference provides a fair balance in terms of data transmission capacity and transmission delay. The convergence process, which involves Gibbs sampling, thus leads to a system-wide optimization in terms of achieving relatively high data transmission capacity and relatively low transmission delays.

Final Remarks

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to communication. A cellular radio system is merely an example. As another example, the invention may be applied to advantage in so-called WiFi and WiMAX communications systems. The invention may equally be applied to advantage in a communication system that does not comprise any access points. What matters is that communication links may potentially interfere with each other.

There are numerous ways of estimating a relative level of interference that a communication link will experience. Such an estimation may be based on measuring signal reception parameters as described hereinbefore. However, it is also possible to make such an estimation on the basis of, for example, geolocation data, which allows determining a geographical location of a communication entity. Information about respective geographical locations of respective communication entities may be used to estimate respective interferences that these communication entities may experience. This information may be supplemented with data obtained through field measurements. For example, a base station signal can be measured at a given geographical location. This data can be used when a user terminal is that this geographical location, or relatively close thereto.

There are numerous sets of parameters relating to a communication link for which values can be set in a probabilistic parameter setting step. Various examples have been provided in the detailed description. As a further example, it is possible to have base station assignment as the single parameter can be set in a probabilistic parameter setting step. That is, in such a step, a controlling entity determines a base station to which a user terminal should be assigned.

There are numerous probability distributions that can be used in a probabilistic parameter setting step. A probability distribution need not necessarily be an exponential function of a cost function as presented in the detailed description by way of example. What matters is that a particular parameter setting is less likely to be selected if this parameter setting is expected to cause a relatively high relative level of interference in a communication link of interest, or if this parameter setting is expected to cause a relatively high relative level of interference in another communication link. That is, the probability distribution should preferably be such that a relatively high relative level of interference is penalized in terms of selection probability, irrespective of a communication link in which the relatively high relative level of interference is expected to occur.

There are numerous ways of implementing a communication system in accordance with the invention. Any entity having control capabilities may carry out the probabilistic parameter setting step. For example, referring to the cellular radio system CRS illustrated in FIG. 1, an entity other than a base station BS may carry out the series of steps SP1-SP8 illustrated in FIG. 5. For example, the cellular radio system CRS may comprise one or more system controllers, which carry out this series of steps, or at least a part thereof. In a manner of speaking, a base station can delegate a task of carrying out the series of steps concerned to another entity in the cellular radio system CRS. It is sufficient that this other entity receives input data required for carrying out the series of steps and delivers a particular parameter setting, as determined in the series of steps, to the base station that should apply this parameter setting.

It should further be noted that the numerous ways for achieving that the probabilistic parameter setting step for a communication link is carried out at randomly determined instants, if so desired. The series of steps SP1-SP8 illustrated in FIG. 5 is merely an example in this respect. As another example, the probabilistic parameter setting step can be carried out at randomly determined instants by means of a random interrupt scheme. The controller CT of the base station BS illustrated in FIG. 3 can randomly receive interrupt signals, whereby an interrupt signal causes the controller CT to carry out a probabilistic parameter setting step for a particular communication link.

The term "interference" should be understood in a broad sense. The term may embrace any signal other than a desired signal carrying data, which may adversely affect transmission of this data in terms of, for example, speed, delay, and errors.

In general, there are numerous different ways of implementing the invention, whereby different implementations may have different topologies. In any given topology, a single module may carry out several functions, or several modules may jointly carry out a single function. In this respect, the drawings are very diagrammatic. For example, referring to FIG. 2, the radio transmitter TX and that radio receiver RX may form part of a single radio transceiver module. The same applies to other functional entities and modules that have been described.

There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

There are numerous ways of storing and distributing a set of instructions, that is, software, which allows controlling a communication system in accordance with the invention. For example, software may be stored in a suitable device readable medium, such as, for example, a magnetic disk, an optical disk, or a memory circuit. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step S does not exclude the presence of a plurality of such elements or steps. The mere fact that respective dependent claims define respective additional features, does not exclude combinations of additional features other than those reflected in the claims.

The invention claimed is:

1. A method of controlling a communication system in which a plurality of communication entities can establish a plurality of communication links that can potentially interfere with each other, in which method the following step is repetitively carried out for respective communication links:

a probabilistic parameter setting step in which a parameter setting to be applied to a communication link, is randomly determined according to a probability distribution, whereby a probability that a particular parameter setting is applied decreases with, on the one hand, a relative level of interference that the communication link is expected to experience from other communication links if the particular parameter setting is applied and, on the other hand, a relative level of interference that other communication links are expected to experience if the particular parameter setting is applied.

2. A method of controlling a communication system according to claim 1, wherein the probability distribution is:

$$PD = C \times \exp(-E \div T),$$

wherein:
PD represents the probability distribution,
C represents a normalizing constant,
exp represents an exponential function,
T represents a probability distribution sharpness parameter; and
E represents a cost function that is specific to a communication link, so that respective communication links have respective cost functions, a cost function of a communication link having as a variable at least one parameter of the communication link, the cost function comprising:
a first term representing the relative level of interference that the communication link is expected to experience from other, neighboring communication links; and
a second term representing the relative level of interference that other, neighboring communication links are expected to experience.

3. A method of controlling a communication system according to claim 2, wherein:
the first term comprises a sum of:
a noise ratio, which is a ratio of noise power to received desired signal power, at a communication entity involved in the communication link; and
an interference ratio, which is a ratio of received interference signal power and received desired signal power, at the communication entity involved in the communication link; and wherein
the second term comprises a sum of respective interference ratios at communication entities involved in other, neighboring communication links.

4. A method of controlling a communication system according to claim 2, wherein the probability distribution sharpness parameter T is a non-negative constant.

5. A method of controlling a communication system according to claim 2, wherein the probability distribution sharpness parameter T has a value that decreases over time at least during a time interval.

6. A method of controlling a communication system according to claim 5, wherein the value of probability distribution sharpness parameter T decreases over time according to a function T=1/log (k+t); log representing a logarithm, k representing a real-value constant, t representing time.

7. A method of controlling a communication system according to claim 1, wherein the probabilistic parameter setting step is repetitively carried out for a communication link at randomly determined instants.

8. A method of controlling a communication system according to claim 7, wherein the probabilistic parameter setting step is carried out in association with:
a random time interval setting step in which a time interval is randomly set, a subsequent probabilistic parameter setting step for the communication link being carried out when this randomly set time interval has expired.

9. A method of controlling a communication system according to claim 8, wherein the time interval is randomly set according to an exponential distribution.

10. A method of controlling a communication system according to claim 1, in which respective communication links are established between respective user terminals and respective access points, whereby several respective user terminals can jointly access the communication system via an access point over several respective channels, whereby the parameter setting that is determined in the probabilistic parameter setting step concerns at least one of the following parameters of the communication link: transmission power, access point allocation, and channel allocation.

11. A method of controlling a communication system according to claim 10, wherein a setting of the transmission power involves a selection of a transmission power level among a set of transmission power levels.

12. A method of controlling a communication system according to claim 11, wherein respective access points repetitively carry out respective probabilistic parameter setting steps for respective communication links, whereby an access point repetitively carries out respective probabilistic parameter setting steps for respective communication links between the access point and respective user terminals, which jointly access the communication system via the access point.

13. A method of controlling a communication system according to claim 10, wherein the respective access points repetitively carry out the following two steps:
an interference data collecting step in which an access point collects interference data relating to respective interference ratios at respective user terminals that access the communication system via the access point; and
an interference data communication step in which an access point transmits the interference data that has been collected to neighboring access points.

14. A method of controlling a communication system according to claim 13, wherein the interference data that the access point collects from a user terminal comprises: a ratio of desired signal to undesired signal at the user terminal, a desired signal power received at the user terminal, and an interference signal power received at the user terminal.

15. A controlling entity for a communication system, the controlling entity being adapted to carry out the method according to claim 1.

16. A device readable medium comprising a set of instructions that enables a device, which is capable of executing the set of instructions, to carry out the method according to claim 1.

* * * * *

UNITED STATES PATENT AND TRADEMARK OFFICE
CERTIFICATE OF CORRECTION

PATENT NO. : 8,374,640 B2  
APPLICATION NO. : 13/097713  
DATED : February 12, 2013  
INVENTOR(S) : Francois Baccelli et al.

It is certified that error appears in the above-identified patent and that said Letters Patent is hereby corrected as shown below:

On the Title Page  
    (73) Assignee should read: Alcatel Lucent, Paris (FR)  
    Institut National De Recherche En Informatique Et En Automatique, Le Chesney (FR)

Signed and Sealed this  
Seventh Day of October, 2014

Michelle K. Lee  
*Deputy Director of the United States Patent and Trademark Office*